Sept. 3, 1940.   H. W. STERTZBACH ET AL   2,213,371
BRAKING MECHANISM FOR RAILWAY CAR TRUCKS
Filed Sept. 10, 1936   3 Sheets-Sheet 1

Inventors
H. W. Stertzbach
AND H. A. Moeller
By Seymour & Bright Attorneys

Sept. 3, 1940.  H. W. STERTZBACH ET AL  2,213,371
BRAKING MECHANISM FOR RAILWAY CAR TRUCKS
Filed Sept. 10, 1936  3 Sheets-Sheet 2

Inventors
H. W. Stertzbach
AND H. A. Moeller
By Seymour & Bright Attorneys

Sept. 3, 1940.  H. W. STERTZBACH ET AL  2,213,371
BRAKING MECHANISM FOR RAILWAY CAR TRUCKS
Filed Sept. 10, 1936   3 Sheets-Sheet 3

Inventors
H. W. Stertzbach
AND H. A. Moeller
By Seymour & Bright
Attorneys

Patented Sept. 3, 1940

2,213,371

UNITED STATES PATENT OFFICE 2,213,371

BRAKING MECHANISM FOR RAILWAY CAR TRUCKS

Harry W. Stertzbach and Harry A. Moeller, Columbus, Ohio, assignors to The Buckeye Steel Castings Company, Columbus, Ohio Application September 10, 1936, Serial No. 100,169

11 Claims. (Cl. 188—46)

This invention relates to braking mechanism and more particularly to brake mechanism for six wheel railway car trucks.

Recently, due to higher train speeds and extremely heavy equipment, the older method of transmitting through pull rods the forces for the application of brakes to the wheels of a car truck from an air cylinder mounted on the body of a vehicle has been improved by mounting the air cylinders directly on the truck. The latter method reduces weight by eliminating long pull rods and heavy body lever arrangements, and in general is maintained at less expense and has greater economy and efficiency than the former method of mounting brake cylinders.

The primary object of the present invention is to make possible the location and operation of the air cylinder upon a six-wheel truck of the equalizer type.

Another object is to provide for each truck a self-contained air brake installation with equal pressures on all brake shoes.

A further object is to provide a system of levers tributary to the truck air cylinder to draw toward each other the two portions of a vertical brake lever system of a truck.

A still further object is to support the weight of the brake levers without interfering with the necessary horizontal translation of said levers relatively to each other.

With the foregoing objects outlined and with other objects in view, the invention consists in the novel features hereinafter described in detail, illustrated in the accompanying drawings, and more particularly pointed out in the appended claims.

Figure 1:
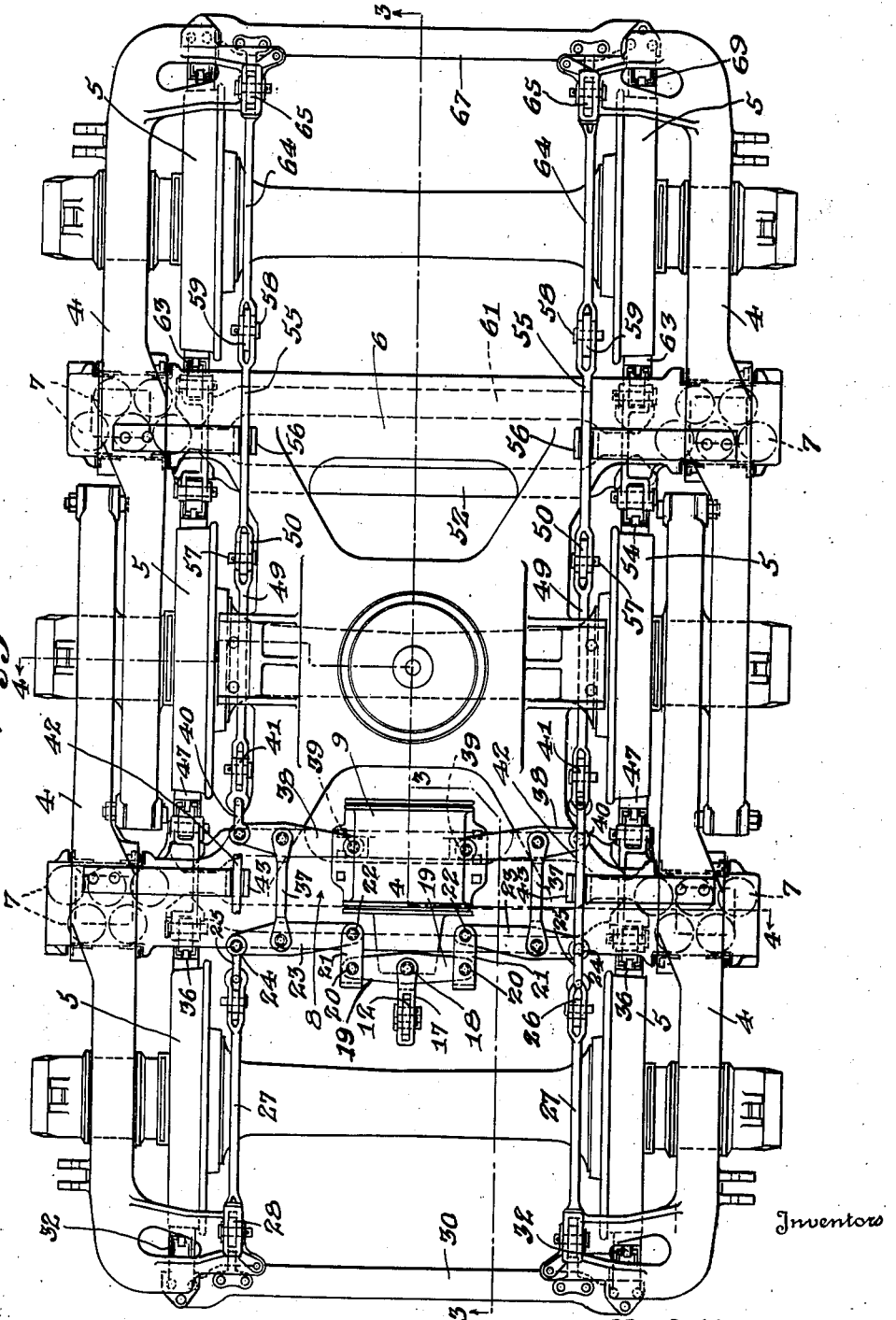
Fig. 1 is a top plan view of an equalizer type of six-wheel truck provided with our improvements.

Referring to the drawings, 4 designates the side frames of a truck mounted upon six wheels 5. Bolster means 6 is supported by springs 7 carried by the side frames and for the purpose of disclosing the present invention the bolster means consists of a one-piece metal casting.

Figures 2, 3:
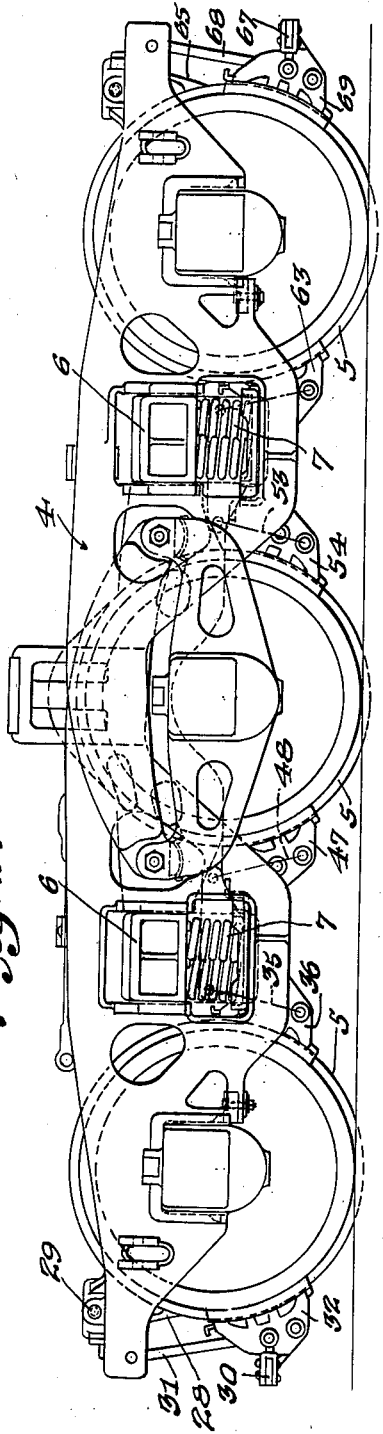
Fig. 2 is a side elevation of the same.
Fig. 3 is a longitudinal vertical sectional view taken on the line 3—3 of Fig. 1.
Figure 4:
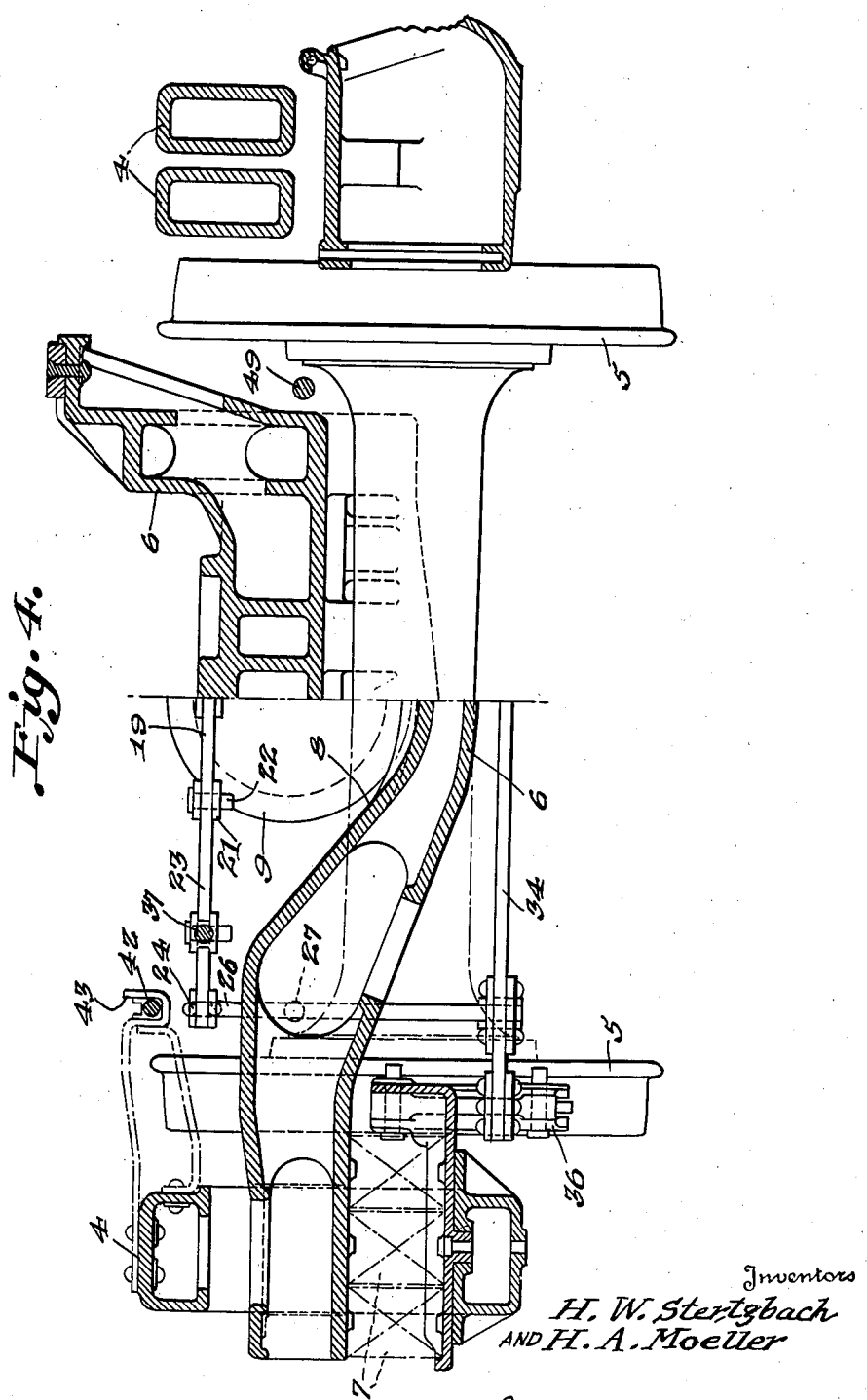
Fig. 4 is a transverse vertical sectional view taken on the line 4—4 of Fig. 1.

As best shown in Fig. 4, one end of the bolster is recessed or provided with a cavity 8 for the reception of an air cylinder 9. This cylinder is bolted to a saddle 8a integral with one end portion of the bolster means and contains a piston (not shown) which actuates a piston rod 10 (Fig. 3), the outer end of which is pivotally connected at 11 to the medial portion of a vertical central lever 12 that is pivotally connected at its lower end, as shown at 13, to a substantially horizontal link 14 having one of its ends pivotally connected at 15 to one end of the bolster.

The upper end of the lever 12 is pivotally connected at 16 to a clevis 17, which in turn is pivotally connected at 18 to the medial portion of a central horizontal lever 19. The ends of the latter are pivotally connected at 20 to horizontal links 21, and these links are pivotally connected at 22 to the inner ends of other horizontal levers 23. The outer ends of the last-mentioned levers are pivotally connected at 24 to links 25 which are connected to the upper end portions of vertical side levers 26. The medial portion of each of these side levers is connected by a horizontal link 27 to a dead end lever 28, the latter being suspended from a pivot pin 29 and being operatively connected to the brake beam 30 associated with a pair of the end wheels of the truck. This beam is suspended from the side frames by links 31 and carries conventional brake shoes 32.

The lower ends of the side levers 26 are pivotally connected by links 33 to a brake beam 34 which is suspended from the bolster by means of links 35. This beam also carries brake shoes 36 which cooperate with the same end wheels of the truck.

The medial portions of the horizontal levers 23 are connected by horizontal links 37 to the medial portions of similar levers 38, the latter having their inner ends pivotally connected to the bolster at 39.

Links 40 connect the outer ends of the levers 38 with other vertical levers 41, and horizontal rods 42 are slidably supported by the side frames as shown at 43 and have their ends connected to the upper ends of the levers 26 and 41. The connection to the upper ends of the levers 41 is of a slot and pin construction as shown at 44.

The lower ends of the levers 41 are connected by links 45 to a third brake beam 46 carrying brake shoes 47 and supported by links 48.

Horizontal connecting rods 49 join the medial portions of the levers 41 to a third set of vertical levers 50, that are connected by links 51 to a brake beam 52, supported by links 53 and carrying brake shoes 54.

Horizontal supporting rods 55 are slidably mounted on the side frames as shown at 56 and have certain of their ends connected at 57 to the upper ends of the levers 50, the opposite ends of these rods being pivotally connected at 58 to the upper ends of another set of vertical levers 59. Links 60 connect the lower ends of these levers with a brake beam 61 that is supported by links 62. This beam also carries brake shoes 63.

Horizontal links 64 connect the medial portions of the levers 59 to the medial portions of dead end levers 65 which are suspended from the side frames and are connected by links 66 to an end brake beam 67, the latter being supported from the frames by links 68 and carrying brake shoes 69.

In operation, it will be understood that when air is introduced into the cylinder 9 to cause the piston rod 10 to move outwardly, this rod will cause the equalizing lever 19 to move away from the cylinder with the result that the levers 23 will be swung about their pivotal connections to the links 37 to cause the rods 27 to move toward the cylinder with the result that the brake shoes 32 will be applied. Simultaneously the levers 26 will move to force the brake shoes 36 against a pair of the end wheels of the truck.

Of course, movement of the levers 23 will also result in movement of the links 37 in the same direction as the piston rod and therefore the links 38 will be swung about their pivots 39 and cause the system of levers and links to apply the shoes 47, 54, 63 and 69 to the other wheels of the truck.

Due to the accumulated slack in brake riggings on both sides of the air cylinder the conventional method of supporting the brake levers, as shown at 56, will not do at points 43. It will therefore be noted that the brake levers depending from the fulcrum bars 42 have four holes each, the upper one being for vertical support only. The slots at 44 allow for the accumulation of slack and prevent fulcrum bars 42 from acting as brake lever pull rods or struts.

Due to the special mounting and H-shaped system of levers and links 23, 37 and 38, it will be understood that all of the brake shoes of a single truck may be effectively and equally applied whenever pressure air is introduced into the cylinder.

While we have disclosed what we now consider to be a preferred embodiment of the invention in such manner that the same may be readily understood by those skilled in the art, we are aware that changes may be made in the details disclosed without departing from the spirit of the invention as expressed in the claims.

What is claimed and desired to be secured by Letters Patent is:

1. In a railway car truck having bolster means and supporting wheels, brake shoes cooperating with the wheels, a pressure fluid cylinder mounted on the bolster means, a piston rod projecting from the cylinder, and means operatively connecting said piston rod to said brake shoes, the last mentioned means including vertical side levers, slidable fulcrum rods supporting said levers, and slot and pin connections joining the fulcrum rods to certain of said side levers.

2. In a railway car truck having bolster means and supporting wheels, brake shoes cooperating with the wheels, a pressure fluid cylinder mounted on the bolster means, a piston rod projecting from the cylinder, and means operatively connecting said piston rod to said brake shoes, the last mentioned means including vertical side levers, slidable fulcrum rods supporting said levers, and slot and pin connections joining the fulcrum rods to certain of said side levers, said side levers being suspended from and supported by said fulcrum rods.

3. In a railway car truck having bolster means and supporting wheels, brake shoes cooperating with the wheels, a pressure fluid cylinder mounted on the bolster means, a piston rod projecting from the cylinder, and means operatively connecting said piston rod to said brake shoes, the last mentioned means including a vertical lever connected to and actuated by said rod and an H-shaped system made up of horizontal levers and a link connecting them, one of said levers being pivotally supported by the bolster system and the other lever being operatively connected to the piston rod.

4. In a railway car truck, bolster means and side frames mounted on supporting wheels, brake shoes cooperating with said wheels, a pressure fluid cylinder carried by the bolster means, a piston rod projecting from the cylinder, a vertical lever connected to and actuated by said rod, a horizontal equalizing lever having its medial portion operatively connected to the vertical lever, and means operatively connecting the opposite ends of the horizontal lever to said brake shoes.

5. In a car truck, wheel supported side frames, bolster means supported by the side frames, brake shoes cooperating with the wheels, a fluid pressure cylinder carried by the bolster means, a piston rod projecting from the cylinder, horizontal levers having their inner ends pivotally connected to the bolster means at opposite sides of the axis of the cylinder, other horizontal levers arranged at opposite sides of said axis, links connecting the medial portions of the levers at opposite sides of said axis, means including a vertical lever and an equalizing bar operatively connecting the inner ends of certain of said levers to said piston rod, and means operatively connecting the outer ends of said levers to the brake shoes.

6. A car truck comprising wheel supported side frames, bolster means supported by the side frames, brake shoes cooperating with said wheels, a fluid pressure cylinder mounted on the bolster means, first horizontal levers pivotally connected to the bolster means and projecting in opposite directions from said cylinder, second horizontal levers, links connecting the medial portions of the first and second levers, a piston rod projecting from the cylinder, means including a vertical lever and an equalizing bar operatively connecting the inner ends of the second levers to said piston rod, and means operatively connecting the outer ends of the first and second levers to said brake shoes.

7. In a railway car truck, wheel-supported axles, axle journals, an unsprung side frame system supported by the axle journals, springs resting on the side frame system, a one-piece bolster supported by the springs, said bolster having end transverse portions and a central portion, one of the end transverse portions of the bolster being provided with a depression at its longitudinal center line forming a cavity, brake shoes cooperating with the wheels, a pressure fluid cylinder mounted on the bolster and resting in said cavity, a piston rod projecting from the cylinder, and means operatively connecting said piston rod to said brake shoes for actuating the latter.

8. In a railway car truck, wheel-supported axle journals, an unsprung side frame system supported by the axle journals, springs resting on the side frame system, a one-piece bolster supported by the springs, said bolster having end transverse portions and a central portion, one of the end transverse portions of the bolster being provided with a depression at its longitudinal center line forming a cavity, brake shoes cooperating with the wheels, a pressure fluid cylinder mounted on the bolster and resting in said cavity, a piston rod projecting from the cylinder, means operatively connecting said piston rod to said brake shoes for actuating the latter, the last-mentioned means including vertical side levers, slidable fulcrum rods supporting said levers, and slot and pin connections joining the fulcrum rods to certain of said side levers.

9. In a railway car truck, wheel-supported axles, axle journals, an unsprung side frame system supported by the axle journals, springs resting on the side frame system, a one-piece bolster supported by the springs, said bolster having end transverse portions and a central portion, one of the end transverse portions of the bolster being provided with a depression at its longitudinal center line forming a cavity, brake shoes cooperating with the wheels, a pressure fluid cylinder mounted on the bolster and resting in said cavity, a piston rod projecting from the cylinder, and means operatively connecting said piston rod to said brake shoes for actuating the latter, the last-mentioned means including vertical side levers, slidable fulcrum rods supporting said levers, and slot and pin connections joining the fulcrum rods to certain of said side levers, said side levers being suspended from and supported by said fulcrum rods.

10. A car truck comprising wheel-supported axles, journals supported by the axles, side frames supported by the journals, springs resting on the frames, a bolster having transverse end portions resting on the springs, one of said transverse end portions of the bolster having a depression forming a cavity at its longitudinal center line, brake shoes cooperating with said wheels, a pressure fluid cylinder carried by the bolster and extending into said cavity, a piston rod projecting from the cylinder, a vertical lever connected to and actuated by said rod, a horizontal equalizing lever having its medial portion operatively connected to the vertical lever, and means operatively connecting the opposite end of the horizontal lever to said brake shoes.

11. A car truck comprising wheels and axles, journals supported by the axles, side frames supported by the journals, springs resting on the frames, a bolster having transverse end portions resting on the springs, one of said transverse end portions of the bolster having a depression forming a cavity at its longitudinal center line, brake shoes cooperating with said wheels, a pressure fluid cylinder carried by the bolster and extending into said cavity, a piston rod projecting from the cylinder, an equalizing lever having its medial portion operatively connected to said piston rod, and means operatively connecting the opposite ends of said equalizing lever to said brake shoes.

HARRY W. STERTZBACH.
HARRY A. MOELLER.